United States Patent Office 3,346,430
Patented Oct. 10, 1967

3,346,430
NF₂ ADDUCTS OF BENZENE
Lawrence J. Engel, Dunellen, N.J., assignor to Esso Research and Engineering Company, a corporation of Delaware
No Drawing. Filed Aug. 14, 1961, Ser. No. 131,420
8 Claims. (Cl. 149—109)

This invention relates to novel $NF_2$ adducts of benzene useful as fluorine oxidizers for burning rocket propellant fuels and relates to preparation of these benzene derivatives.

In accordance with the present invention, benzene has been found to react safely with $N_2F_4$ and in an unexpected manner to form such novel compounds as the bis ($NF_2$) and the tetrakis ($NF_2$) adducts represented by the following structural formulae:

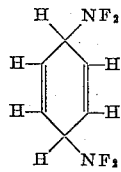   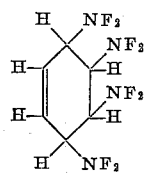

Bis Adduct
Molecular Weight=182

Tetrakis Adduct
Molecular Weight=286

The $NF_2$ adducts of benzene have high specific gravities and suitably high thermal stability.

Process variable studies have determined safe and suitable conditions for the reaction of benzene with $N_2F_4$, including temperature, contact time, mole ratio of reactants, pressure and reaction medium.

In the study of the benzene-$N_2F_4$ reaction a 2-liter Pyrex flask was used as a low pressure reactor and a stainless steel bomb was used as a high pressure reactor.

A successful procedure for preparing the benzene ($NF_2$) adducts is given in the following example:

EXAMPLE

Dry benzene in measured quantity was placed in the reactor which was then chilled to liquid nitrogen temperature ($-196°$ C.) and evacuated to be freed of gas. A measured amount of $N_2F_4$ gas, e.g. 6 g. for 1 g. of benzene, was slowly added to the chilled benzene and condensed to solid particles. The reactor containing the solidified $N_2F_4$ and benzene was given a further evacuation of gas at $-196°$ C. The reactor and its reactant mixture content were warmed to room temperature, heated to the desired reaction temperature and then maintained at the reaction temperature, e.g. 150° C. under the pressure generated by the reaction mixture components for the reaction period. At the end of the reaction period, the reaction mixture was cooled down to $-78°$ C. to condense the benzene adduct products and unreacted $N_2F_4$ gas was removed to cold trap at ($-196°$ C.). Vacuum or dry $N_2$ purge gas can be employed in removal of the unreacted $N_2F_4$ gas. To remove the benzene adduct products, the reactor is filled with dry nitrogen under pressure and the liquid adducts were pipetted out at room temperature. Alternatively, the adducts are vacuum distilled from the reactor.

The low pressure reaction of benzene with $N_2F_4$ is carried out under a pressure of about 200 mm. Hg to 760 mm. Hg absolute at preferably about 200° C. to 300° C.

The high pressure reaction of benzene with $N_2F_4$ is carried out under a pressure of about 0 to 450 p.s.i.g. and at a temperature of preferably 150 to 250° C.

A study of the process variables gave the following results.

*Temperature of reaction range (150 to 350° C.)*

At 150° C., the reaction is slow and gave less than 1% conversion after 10 hours of reaction at 550 mm. Hg with a 2/1 $N_2F_4$/benzene mole ratio. In the range of 200° C. to 300° C., the reaction is fast and complete conversion of the benzene is obtained but some conversion to undesirable products occurs, e.g. to polymeric products, if temperature is not adequately controlled for a suitable contact period. At 350° C., detonation occurs if diluent such as $CCl_4$ is not present. With enough of such diluent and precautions for controlling the process variables the reaction temperature may be increased.

*Contact time (1 minute to 20 hours)*

As the reaction temperature is increased, the conversion rate of the benzene to the desired adducts is increased and increasing contact time gives increased formation of degradation products, higher than benzene products and polymeric deposits thus giving lower yields. This is shown by the results from a reaction at 250° C. of the reactants in a mole ratio of $2NF_4/1C_6H_6$.

TABLE I

*Effect of reaction time on recovery*

Reaction period, hrs.: 0.5; 1; 2.
Recovery, g./g. $C_6H_6$: 1.53; 1.39; 0.90.

Therefore, short periods of conversion are indicated to be desirable at the higher reaction temperature levels.

*Mole ratio of $N_2F_4/C_6H_6$ (1/1 to 12/1)*

Increasing the mole ratio of the $N_2F_4/C_6H_6$, e.g. from 2/1 to 4/1, increases the conversion rate and recovery of desired product.

*Pressure (200 mm. Hg abs. to 450 p.s.i.g.)*

The reaction takes place under increased pressure with higher $N_2F_4$ mole ratio to benzene at the higher reaction temperatures, but with perhalohydrocarbon diluent e.g. $CCl_4$ present, e.g. $3CCl_4/1C_6H_6$ at 250° C. under 450 p.s.i.g. in reacting $3N_2F_4/1C_6H_6$.

The low pressure (500 mm. Hg abs.) reaction product was subjected to fractionation and the fractions were analyzed.

The product fraction having a relative retention time of approximately 12 (benzene=1) by gas chromatography (GC) analyzed for constituents and was compared to theoretical elemental analyses as follows:

TABLE II

*Elemental analysis of benzene ($NF_2$) adducts*

12 RRT fraction: C, 28.3; H, 2.0; N, 18.0; F, 53.3.
Bis ($NF_2$ adduct theory): C, 39.6; H, 3.3; N, 15.4; F, 41.7.
Tetrakis ($NF_2$) adduct (theory): C, 25.1; H, 2.1; N, 19.6; F, 53.2.

The relative retention time (RRT) measurements were made relative to 1 as the retention time of benzene.

The ultraviolet (UV) and fine line nuclear magnetic resonance (NMR) analyses showed no benzene structure present in the product of complete benzene conversion. There was no evidence of $HNF_2$ in the product gases. There was no evidence of a 1,3 conjugated system by UV analysis. A more detailed GC analysis showed that the 12 RRT fraction was a mixture of bis $NF_2$ adduct (1,4-bis difluoraminocyclohexadiene) and tetrakis difluoramino cyclohexene.

The low pressure reaction product fraction showed no evidence of or only a small amount of C—F or C=NF configurations. The analyses of this material showed it to be a blend of the nonconjugated bis ($NF_2$) cyclohexadiene and tetrakis ($NF_2$) cyclohexene.

The more precisely fractionated material of 11.5 RRT by GC analysis gave an elemental analysis corresponding to a blend of the bis and tetrakis adducts of benzene. This fraction was further reacted as feed with $N_2F_4$ under 450 p.s.i.g. at 8 $N_2F_4/1$ feed with mixing in a bomb reactor at 200° for ½ hour. The change in GC distribution for the recovered product compared to the starting material (bis and tetrakis blend) and the 11.5 RRT base product peak amounted to 65% of the starting material. Elemental analysis showed conversion of the bis adduct to the tetrakis adduct in this second reaction.

*TABLE III.—Elemental analysis*

[Comparison of feed to second reaction product reaction at 200° C. 450 p.s.i.g.]

|   | Feed, Bis+Tetrakis ($NF_2$) Benzene | Product |
|---|---|---|
|   | *Percent* | |
| F | 45.6 | 55.3 |
| N | 17.0 | 17.6 |
| C | 29.9 | 25.41 |
| H | 1.9 | 1.88 |
|   | Bis ($NF_2$) Cyclohexadiene Theory | Tetrakis ($NF_2$) Cyclohexene Theory |
|   | *Percent* | *Percent* |
| F | 41.7 | 53.2 |
| N | 15.4 | 19.6 |
| C | 39.6 | 25.1 |
| H | 3.3 | 2.1 |

The foregoing analysis is proof that the bis ($NF_2$) adduct was converted into more of the tetrakis ($NF_2$) adduct. Solubility of the product in sulfuric acid indicates that the product is not a saturated $NF_2$ cyclohexane.

From analyses of the various products formed, the main reactions identified are the addition of $NF_2$ groups to one and two of the benzene double bonds to form the bis and tetrakis ($NF_2$) adducts. As the reaction temperatures and pressures are increased, more C—H bonds may tend to be replaced by C=NF and C—F bonds. This accounts for the increased proportion of percent F and lowering of percent H in the elemental analysis.

The bis ($NF_2$) adduct of benzene is a clear pale yellow liquid having a specific gravity close to 1.6. With its two double bonds remaining in the ring, it is useful as an intermediate for making the tetrakis ($NF_2$) adduct, as disclosed. It may also be used as an intermediate for other reactions.

The tetrakis ($NF_2$) cyclohexene product is useful for high-energy propellants. For example, it may be compounded in a 20 wt. percent proportion with 20 wt. percent of a binder like polybutadiene-$NF_2$ adduct, 4 wt. percent powdered boron and 56 wt. percent hexanitroethane to make a composite having a specific impulse of close to 285 (lbs. thrust per second per lb. of propellant). The high specific gravity (Sp. g., c.a., 1.6) gives this tetrakis adduct favorable value for relative boost velocity.

A mixture of the bis and tetrakis ($NF_2$) adducts of benzene may also be used with potent oxygen oxidizers and highly energetic polymers e.g. those containing up to about 1 $NF_2/C$ in making high-energy propellant systems. Such a mixture or blend of the $NF_2$ adducts of benzene is characterized by an elemental analysis of 45 to 56 wt. percent F, 17 to 20 wt. percent N, 1.8 to 2 wt. percent H, and 25 to 30 wt. percent C. The precise percent of each constituent depends on the conditions and extent of conversion to the higher molecular weight adduct and exact fractionation.

The process of converting benzene to the $NF_2$ adducts can be carried out in stages, batchwise or in a continuous flow system.

Various modifications come within the scope of the invention claimed.

The invention described is claimed as follows:

1. Bis (difluoramino) cyclohexadiene.
2. Tetrakis (difluoramino) cyclohexene.
3. A blend of bis and tetrakis (difluoramino) adducts of benzene containing bis (difluoramino) cyclohexadiene and tetrakis (difluoramino) cyclohexene as said adducts.
4. A blend of $NF_2$ adducts of benzene characterized by an elemental analysis of 45 to 56 wt. percent F, 17 to 20 wt. percent N, 25 to 30 wt. percent C, and 1.8 to 2 wt. percent H, said $NF_2$ adducts bieng principally bis (difluoramino) cyclohexadiene and tetrakis (difluoramino) cyclohexene.
5. Process for preparing bis $NF_2$ and tetrakis $NF_2$ adducts of benzene which comprises reacting benzene with $N_2F_4$ in at least 1:1 mole ratio at a temperature in the range of about 100 to 350° C. under a pressure of 200 mm. Hg absolute to about 450 p.s.i.g., then recovering the resulting $NF_2$ adducts of the benzene.
6. Process for preparing $NF_2$ adducts of benzene which comprises reacting 1 to 2 moles of $N_2F_4$ with a mole of benzene under a pressure in the range of about 200 mm. Hg to 760 mm. Hg absolute and at a temperature of about 200° to 300° C. and recovering a product containing bis and tetrakis $NF_2$ adducts of benzene.
7. Process for preparing tetrakis ($NF_2$) cyclohexene which comprises reacting 1 mole of $N_2F_4$ with bis ($NF_2$) cyclohexadiene in the presence of $CCl_4$ under a pressure of about 15 to 450 p.s.i.g. and at a temperature of about 150° to 250° C. and recovering a product containing principally tetrakis ($NF_2$) cyclohexene.
8. An $NF_2$ adduct of benzene selected from the group consisting of bis (difluoramino) cyclohexadiene and tetrakis (difluoramino) cyclohexene.

No references cited.

CARL D. QUARFORTH, *Primary Examiner.*

LEON D. ROSDOL, ROGER L. CAMPBELL,
*Examiners.*

J. W. WHISLER, L. A. SEBASTIAN,
*Assistant Examiners.*